(12) United States Patent
Kimura et al.

(10) Patent No.: US 6,407,033 B1
(45) Date of Patent: *Jun. 18, 2002

(54) PHOTOCATALYTIC COATING COMPOSITION AND PHOTOCATALYST-BEARING STRUCTURE

(75) Inventors: Nobuo Kimura, Oiso-machi; Tetsuo Yoshimoto, Odawara, both of (JP)

(73) Assignee: Nippon Soda Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/077,465

(22) PCT Filed: Oct. 7, 1997

(86) PCT No.: PCT/JP97/03590
§ 371 (c)(1),
(2), (4) Date: Aug. 31, 1998

(87) PCT Pub. No.: WO98/15600
PCT Pub. Date: Apr. 16, 1998

(30) Foreign Application Priority Data

Oct. 8, 1996 (JP) .............................. 8-286002
Oct. 29, 1996 (JP) .............................. 8-303608

(51) Int. Cl.[7] .................... B01J 31/00; B01J 23/00; B01J 21/08; B01J 21/12; B01J 21/14
(52) U.S. Cl. ................. 502/350; 502/158; 502/236; 502/242; 106/287.19
(58) Field of Search .................. 502/350, 236, 502/242, 158; 106/287.19

(56) References Cited

U.S. PATENT DOCUMENTS

| | | | | | |
|---|---|---|---|---|---|
| 4,814,017 A | * | 3/1989 | Yoldas et al. | ........... | 106/287.12 |
| 4,830,672 A | * | 5/1989 | Yamada et al. | ......... | 106/287.19 |
| 5,114,890 A | * | 5/1992 | Peterson | ..................... | 501/103 |
| 5,192,364 A | * | 3/1993 | Inoue et al. | ........... | 106/287.16 |
| 5,366,545 A | * | 11/1994 | Yajima et al. | ......... | 106/287.16 |
| 5,616,532 A | * | 4/1997 | Heller et al. | ................. | 502/242 |
| 5,656,073 A | * | 8/1997 | Glaubitt et al. | ......... | 106/287.19 |
| 5,683,501 A | * | 11/1997 | Tomihisa et al. | ...... | 106/287.19 |
| 5,755,867 A | * | 5/1998 | Chikuni et al. | ......... | 106/287.16 |
| 5,780,380 A | * | 7/1998 | Endoh et al. | ................ | 502/300 |
| 5,854,169 A | * | 12/1998 | Heller et al. | ................. | 502/242 |
| 5,872,072 A | * | 2/1999 | Mouri et al. | ................. | 502/208 |
| 5,897,958 A | * | 4/1999 | Yamada et al. | .............. | 446/474 |
| 6,037,289 A | * | 3/2000 | Chopin et al. | .................. | 502/2 |
| 6,228,480 B1 | * | 5/2001 | Kimura et al. | .............. | 428/328 |

* cited by examiner

Primary Examiner—Mark L. Bell
Assistant Examiner—Patricia L. Hailey
(74) Attorney, Agent, or Firm—Venable; Marina V. Schneller

(57) ABSTRACT

The present invention relates to photocatalyst-carrying structures which can be used particularly in an environment of high temperature and humidity or outdoor environment requiring alkali resistance and also to composites of photocatalyst coating materials to produce the said structures. The composites of photocatalyst coating materials are characterized in containing a photocatalyst and a zirconium compound and/or tin compound in order to endow alkali resistance. The photocatalyst-carrying structure has an adhesive layer between a photocatalyst layer and a carrier. The photocatalyst layer contains a photocatalyst, and a zirconium compound and/or tin compound to endow alkali resistance.

35 Claims, No Drawings

PHOTOCATALYTIC COATING COMPOSITION AND PHOTOCATALYST-BEARING STRUCTURE

FIELD OF THE INVENTION

The present invention relates to photocatalyst-carrying structures used for antifouling, cleaning water, deodorization, pasteurization, treatment of waste water, water decomposition, algae growth control and various chemical reactions and to coating material composites to produce the said photocatalyst-carrying structures. This invention relates to, in particular, to photocatalyst-carrying structures and photocatalyst coating materials, which can be used in the environment of high temperature and humidity and in the outdoor environment in which they should be alkali resistant.

BACKGROUND ART

Various types of carrier materials carrying a photocatalyst have been proposed. Examples are (A) light transmissible materials such as cellulose nitrate, glass, poly(vinyl chloride), plastics, nylon, methacrylic resins and polypropylene (Japanese Patent Laid-Open No. Sho 62-66861), (B) polypropylene fibers and ceramics (Japanese Patent Laid-Open No. Hei 2-68190) and (C) glass, ceramics, nylon, acrylic resin and polyester (Japanese Patent Laid-Open No. Hei 5-309267). However, it has been reported that, among the materials mentioned above, those comprising an organic substance used as its main component had a disadvantage of the decomposition or deterioration of the organic material when it carried a photocatalyst due to the catalytic reaction and that their durability was a problem (Fumiaki Ootani; Kobunshi Kako Vol. 42, No 5, page 18 (1993) and "Titanium Dioxide" by Manabu Kiyono, published by Gihodo, page 165).

In case that a carrier material is inorganic, such as glass or ceramic, the use of organic polymer resin as an adhesive for carrying a photocatalyst lowers the catalytic activity due to covering the surface of the photocatalyst particles by the resin. Besides, the resin is decomposed or deteriorated by the photocatalytic activity and the photocatalyst is exfoliated. The result is a problem in durability.

In case that a carrier material is an inorganic heat-resistant material, the following methods have been employed: spattering in which no organic materials are left at all (Japanese Patent Laid-Open No. Sho 60-044053), coating and baking of organic titanate (Japanese Patent Laid-Open No. Sho 60-118236) and spraying and baking of titania sol (Japanese Patent Laid-Open No. Hei 5-253544). These methods had problems of baking a substrate at a high temperature in order to produce and crystallize photocatalyst particles on the carrier and to adhere the photocatalyst with the carrier as well as difficulty in carrying the photocatalyst over a large area and very high production cost.

In order to carry a photocatalyst on glass fiber paper, a method to use a metal oxide sol as an adhesive has been proposed (Japanese Patent Laid-Open No. Hei 5-309267). Metal oxide sols, such as silica sol, have very weak bonding strength because it is based on the van der Waals force (Fine Ceramics, Vol. 1, page 216–223, 1980) and insufficient adhesiveness and alkali resistance. A baking process at a high temperature was required. The method was thus unable to apply for all carriers including general-purpose resins decomposed easily by heat.

In case that photocatalyst powder is carried on a metal oxide gel such as silica or clay mineral, it has been reported that the photocatalytic decomposition reaction of propione aldehyde gas is accelerated thanks to the effect of the carrier working as an adsorbent (Symposium "Recent Development in Photocatalytic Reaction", previous manuscripts, by the Study of Photofunctional Materials, No.2-11, page 39, 1994). There have been no reports that photocatalyst-carrying structures excellent in adhesiveness and alkali resistance were obtained while maintaining high catalytic activity of a photocatalyst uniformly dispersed in a metal oxide gel.

There have been many attempts to adhere a photocatalyst directly on a carrier with a silica compound such as silica sol, colloidal silica, a hydrolysate of silicon alkoxide or polyorganosiloxane (Japanese Patent Laid-Open Nos. Hei 4-174679, Hei 6-296874 and Hei 7-171408). In each case, the surface of the photocatalyst layer was eroded and exfoliated when a photocatalyst-carrying structure was contacted with an aqueous solution of 5% by weight of sodium carbonate for 24 hours. It did not pass the alkali-resistance test defined in JIS K5400.

A method to fix a photocatalyst with fluororesin has been proposed (Japanese Patent Laid-Open No. Hei 6-315614). Its disadvantages are that fluororesin is expensive and that most surface of a catalyst particle should be covered with the fluororesin in order to adhere photocatalyst particles strongly on a carrier. As a result the catalytic activity becomes lower than that of powder. It has been tried that a photocatalyst was mixed with a non-decomposable binder such as fluororesin or polyorganosiloxane and adhered onto a substrate (EP-0633064). The products were unsatisfactory to solve practical problems of adhesiveness and alkali resistance.

Japanese Patent Laid-Open No. Hei 8-164334 has disclosed composites to produce a photocatalyst film, which consists of fine particles of titanium oxide of 1–500 nm, products of partially hydrolyzed silicon tetraalkoxide and a solvent. A photocatalyst film formed by using the said composite was exfoliated after being immersed in an aqueous solution of 5% by weight of sodium carbonate for 24 hours. The alkali resistance was thus unsatisfactory.

The following three themes should be solved to use a photocatalyst carried on a carrier outdoors or in the environment of high temperature and humidity:

1. A photocatalyst film adheres well with a carrier;
2. The photocatalytic activity of a photocatalyst film is not reduced due to a photocatalyst carried on a carrier; and
3. The carried photocatalyst film maintains bonding strength and is durable for a long time.

When a photocatalyst is used outdoors, alkali resistance is important, same as for paints and coating materials for outside walls. Particularly it is essential to resist aqueous alkaline solutions because it is impossible to avoid contacting with alkaline components seeping out from concrete, mortar or tile joints when used for outside walls and their surroundings. Therefore, an alkaline resistance test using an aqueous solution of 5% by weight of sodium carbonate is defined in JIS-K5400 of the Japan Industrial Standards for general paints. The present invention aims at providing structures carrying a photocatalyst which can be used for antifouling, cleaning water, deodorization, pasteurization, treatment of waste water, water decomposition, algae growth control and various chemical reactions and for solving the above-mentioned problems, and coating materials to produce the said structures.

DISCLOSURE OF THE INVENTION

In order to solve the problems mentioned above, composites of photocatalyst coating materials of this invention are (Composition 1) is a composite of photocatalyst coating materials which is characterized in containing a photocatalyst and a zirconium compound and/or tin compound for endowing alkali resistance.

As a more detailed composition of Composition 1, (Composition 2) is that the zirconium or tin compound is a zirconium or tin compound represented by Formula [I]

$$MO_xL_y \qquad \text{Formula [I]}$$

wherein M is zirconium or tin, x is 0, 1 or 2, L is a substituent selected from the group consisting of hydroxyl, nitrate, carbonate, ammonium, chlorine, carboxyl of 1 to 6 carbons, alkoxyl of 1 to 6 carbons, glycol of 1 to 6 carbons and substituents able to form a metal chelate compound by substituting the said alkoxy group, y is 0 or an integer of 1 to 4, and 2x+y=4, or a mixture thereof;

As a more detailed composition of Composition 1 or 2, (Composition 3) is that the zirconium or tin compound is a compound selected from the group consisting of zirconium or tin oxide, hydroxide, oxyhydroxide, oxycarbonate, alkoxides of 1 to 4 carbons and hydrolysates of the said alkoxides or a mixture thereof;

As a more detailed composition of one of Compositions 1 to 3, (Composition 4) is a composite of photocatalyst coating materials, which contains the following components of (1) to (5):

(1) 0.0001–1% by weight of a surface active agent to the whole coating material, (2) 0.5–10% by weight, as solid matter, of a sol of oxide or hydroxide of metal selected from the group consisting of silicon, aluminum, niobium and tantalum or a mixture thereof, as a photocatalyst binder, to the whole coating materials, (3) 0.02–3% by weight of a zirconium or tin compound as an agent to give alkali resistance, in conversion to the weight of metal oxide, to the whole coating material, (4) 0.5–10% by weight of a photocatalyst, as solid matter, to the whole coating material and (5) water alone or a mixed solvent of water and alcohol within the range of 100/0–20/80 of water/alcohol ratio by weight;

As a more detailed composition of one of Compositions 1 to 4, (Composition 5) contains 0.02–1% by weight of a zirconium or tin compound, in conversion to the weight of metal oxide, to the whole coating material;

As a more detailed composition of one of Compositions 1 to 5, (Composition 6) is that the metal oxide or hydroxide sol is a hydrolysate of a metal alkoxide having at least an alkoxy group of 1 to 5 carbons and selected from silicon, aluminum, niobium and tantalum or two or more of the hydrolysates or products produced from the said hydrolysates and has 50 m²/g or more of specific surface area when dried at 150° C.;

As a more detailed composition of one of Compositions 1 to 6, (Composition 7) contains 0.1–5% by weight of a silicon alkoxide having an alkoxy of 1 to 5 carbons and/or polycondensation reaction products of the said silicon alkoxide, as nonvolatile matter, to the whole photocatalyst coating material composite;

As a more detailed composition of one of Compositions 1 to 7, (Composition 8) contains 0.1–5% by weight of a silicon-modified resin or a silane coupler to the whole coating material composite;

As a more detailed composition of one of Compositions 1 to 8, (Composition 9) is that the photocatalyst contains titanium oxide as a main component;

As a more detailed composition of one of Compositions 1 to 9, (Composition 10) is that the photocatalyst is a water-dispersible sol of titanium oxide of 5–40 nm in diameter of crystal particle;

As a more detailed composition of one of Compositions 4 to 10, (Composition 11) is that the alcohol used in the coating material composite is methanol, ethanol, n-propanol or isopropanol alone or a mixture thereof.

A photocatalyst-carrying structure produced with a photocatalyst coating material in accordance with the present invention is that (Composition 12) has a structure with an adhesive layer between a photocatalyst layer and carrier and is that the photocatalyst layer contains a photocatalyst and zirconium and/or tin compounds to give alkali resistance.

As a more detailed composition of Composition 12, (Composition 13) is that the adhesive layer is a silicon-modified resin containing 2–60% by weight of silicon, a resin containing 5–40% by weight of colloidal silica, or a resin containing 3–60% by weight of polysiloxane of a polycondensation product of a compound represented by Formula [II]

$$SiCl_{n_1}(OH)_{n_2}R_{1n_3}(OR_2)_{n_4} \qquad \text{Formula [II]}$$

wherein $R_1$ is an alkyl of 1–8 carbons which may be substituted by amino, carboxyl or chlorine, $R_2$ is an alkyl of 1–8 carbons which is substituted by an alkyl of 1–8 carbons or an alkoxy of 1–8 carbons, $n_1$, $n_2$ and $n_3$ are 0, 1 or 2, $n_4$ is an integer of 2–4 $n_1+n_2+n_3+n_4=4$, and the photocatalyst layer is a photocatalyst complex containing 2–30% by weight of zirconium and/or tin compounds, in conversion to the weight of metal oxides, to the whole photocatalyst layer, 15–85% by weight of a gel of metal oxide or hydroxide, as solid matter to the whole photocatalyst layer and 5–75% by weight of a photocatalyst to the whole photocatalyst layer;

As a more detailed composition of Composition 12 or 13, (Composition 14) is a structure passing an alkali resistance test defined in JIS K5400 after the surface of the photocatalyst-carrying structure is contacted with an aqueous solution of 5% by weight of sodium carbonate at 20° C. for 24 hours;

As a more detailed composition of one of Compositions 12 to 14, (Composition 15) is that the zirconium and/or tin compound contained in the photocatalyst layer is a compound represented by Formula [I]

$$MO_xL_y \qquad \text{Formula [I]}$$

where M, x, L and y are as defined above, or a mixture thereof;

As a more detailed composition of one of Compositions 12 to 15, (Composition 16) is that the content of the zirconium and/or tin compound contained in the photocatalyst layer is 2–10% by weight, in conversion to the weight of metal oxide, to the whole photocatalyst layer;

As a more detailed composition of one of Compositions 12 to 16, (Composition 17) is that the metal oxide or hydroxide gel contained in the photocatalyst layer is an oxide or hydroxide of metal selected from the group consisting of silicon, aluminum, niobium and tantalum or a mixture thereof and has a specific surface area of 50 m²/g or more;

As a more detailed composition of one of Compositions 12 to 17, (Composition 18) is that the photocatalyst layer is formed using a photocatalyst layer coating material which contains 0.1–5% by weight of silicon alkoxide having an alkoxy of 1–5 carbons and/or a polycondensation reaction product of the said silicon alkoxide, as nonvolatile matter, to the whole photocatalyst layer coating material;

As a more detailed composition of one of Compositions 12 to 18, (Composition 19) is that the silicon-modified resin in the adhesive layer is an acrylic-silicon resin, epoxy-silicon resin, polyester-silicon resin or a mixture thereof;

As a more detailed composition of one of Compositions 12 to 19, (Composition 20) is that polysiloxane in the polysiloxane-containing resin of the adhesive layer is a hydrolysate of silicon alkoxide having an alkoxy of 1–5 carbons or a product produced from the said hydrolysate;

As a more detailed composition of one of Compositions 12 to 19, (Composition 21) is that colloidal silica in the colloidal-silica containing resin of the adhesive layer is smaller than 10 nm in particle diameter;

As a more detailed composition of one of Compositions 12 to 20, (Composition 22) is that the adhesive layer is a silicon-modified resin containing polysiloxane;

As a more detailed composition of one of Compositions 12 to 19 and 21, (Composition 23) is that the adhesive layer is a silicon-modified resin containing colloidal silica;

As a more detailed composition of one of Compositions 12 to 23, (Composition 24) is that the adhesive layer is 0.1 μm–20 mμ thick;

As a more detailed composition of one of Compositions 12 to 24, (Composition 25) is that the photocatalyst layer is 0.1 μm–20 mμ thick;

As a more detailed composition of one of Compositions 12 to 25, (Composition 26) is that the whole light transmittance through the adhesive and photocatalyst layers at the wavelength of 550 nm is 70% or more;

As a more detailed composition of one of Compositions 12 to 26, (Composition 27) is that adhesiveness gains 6 points or more in the cross-cut Scotch tape test defined in JIS K5400 after irradiating with black light of 3 mW/cm$^2$ of ultraviolet intensity for 500 hours at the temperature of 40° C. and 90% R.H.;

As a more detailed composition of one of Compositions 12 to 27, (Composition 28) is that the carrier is in the shape of particle, film, plate, tube, fiber or net;

As a more detailed composition of one of Compositions 12 to 28, (Composition 29) is that the carrier material is organic polymer or metal.

A photocatalyst-carrying structure produced by using a coating material of this invention with the above-mentioned composition is highly adhesive, which is proved by that adhesiveness constantly gains 6 points or more in the cross-cut Scotch tape test defined in JIS K5400 after irradiating with black light of 3 mW/cm$^2$ of ultraviolet intensity for 500 hours at the temperature of 40° C. and 90% R.H. It has also excellent weather resistance, which is proved by that adhesiveness always gains 6 points or more in the cross-cut Scotch tape test of JIS K5400 after an accelerated weathering test is carried out with a sunshine weather meter for 500 hours. Furthermore, the structure of this invention passes an alkali resistance test defined in JIS K5400 after it is immersed in an aqueous solution of 5% by weight of sodium carbonate for 24 hours. Every sample keeps high photocatalytic activity. Therefore the structures of this invention can exhibit their characteristics satisfactorily for a variety of applications.

A sol of metal oxide or hydroxide in a photocatalyst coating material in accordance with this invention has an effect of fixing and adhering a photocatalyst on a substrate after it is dried. The said sol of metal oxide or hydroxide becomes porous after dried so as to have also an effect of giving adsorptive property to the obtained photocatalyst-carrying structure for improving photocatalytic activity. A photocatalyst coating material contains preferably 0.5–10% by weight of the sol of metal oxide or hydroxide as solid matter. If less than 0.5% by weight, adhesion with a substrate is insufficient. If exceeding 10% by weight, photocatalytic activity is unsatisfactory. Adhesion becomes stronger and catalytic activity is improved if a specific surface area of the sol of metal oxide or hydroxide is preferably 50 m$^2$/g or more, and more preferably 100 m$^2$/g or more, when dried at 150° C.

One or two or more metals selected from silicon, aluminum, niobium and tantalum are preferred as metal components of metal oxides or hydroxides. Preferred are silicon, aluminum and niobium and combinations of silicon-aluminum, silicon-niobium, silicon-tantalum, silicon-aluminum-niobium and silicon-aluminum-tantalum. A coating material composite is used more preferably, containing 0.1–5% by weight of a solution or suspension of silicon alkoxide having 1 to 5 carbons and/or a product of polycondensation reaction of the said silicon alkoxide or polymethoxysiloxane or polyethoxysiloxane which is polycondensed by hydrolysis, as nonvolatile matter. With the use of the above-mentioned, the obtained photocatalyst film is excellent in transparency, uniformity and hardness.

It is possible to use a mixture of oxide or hydroxide sols of one or two or more metals selected from silicon, aluminum, niobium and tantalum as metal components of metal oxide or hydroxide sols, with zirconium or tin compounds. A photocatalyst film formed with the said coating material containing the above-mentioned components is improved in adhesion after immersed in an aqueous solution of 5% by weight of sodium carbonate for 24 hours. When a specific surface area of the oxide or hydroxide sols is 50 m$^2$/g or more, and more preferably 100 m$^2$/g or more, when the sols are dried at 150° C., a thin film obtained is highly adhesive, is improved in catalytic activity and keeps excellent adhesiveness even after immersed in an aqueous alkaline solution. In practical use mixed sols or composite oxide sols produced by a method such as coprecipitation can be used. It is preferable to make a composite with a photocatalyst by mixing uniformly in a form of sol or mixing in a stage of starting materials before preparing sols make a composite with a photocatalyst.

Methods to prepare sols are hydrolysis of metal salts, decomposition by neutralization, ion exchange, hydrolysis of metal alkoxides and the like. Any of the methods can be used if photocatalyst powder is uniformly dispersed in a sol. The presence of a large quantity of impurities in a sol gives a bad effect on the adhesiveness and catalytic activity of a photocatalyst. Sols with few impurities are preferred.

A compound represented by Formula [I]

$$MO_xL_y \qquad \text{Formula [I]}$$

where M, x, L and y are as defined above, or a mixture thereof is preferably used as a zirconium or tin compound added to a photocatalyst coating material.

Examples of compounds of Formula [I] are zirconium oxide, zirconium oxynitrate, zirconium oxychloride, hydrated zirconium oxide, zirconium oxyhydroxide, hydrated zirconium oxynitrate, hydrated zirconium oxychloride, zirconium carbonate, zirconium oxalate, zirconium acetate, zirconium tetraisopropoxide, zirconium tetrabutoxide, zirconium dibutoxide acetylacetate, zirconium dibutoxide lactate, hydrolysates of zirconium tetrabutoxide, hydrolysates of zirconium tetraisopropoxide, tin oxide, hydrated tin oxide, tin hydroxide, tin acetate, tin oxalate, tin tetramethoxide, tin tetraethoxide, thin tetraisopropoxide, tin tetrabutoxide, tin dibutoxide acetylacetate, hydrolysates of tin tetrabutoxide and hydrolysates of tin tetraisopropoxide.

One or two or more compounds selected from the group consisting of oxides, hydrated oxides, oxynitrates, hydrated oxynitrates, alkoxides of 1–4 carbons and hydrolysates of the said alkoxides are preferably used as zirconium or tin compounds added to the photocatalyst coating material. A coating material can be obtained to produce a targeted photocatalyst-carrying structure with better alkali resistance. These compounds may be added to a photocatalyst coating material by mixing with a sol or solution of metal oxide or hydroxide which is used together with a photocatalyst, by mixing with a sol or solution for forming a photocatalyst or by any other methods able to uniformly add into a photocatalyst coating material.

Organic carbon components, if contained in a zirconium or tin compound, are decomposed by oxidation due to photocatalytic action. An amount of the organic carbon components is small, for the zirconium or tin compounds in the photocatalyst material are less than 3% by weight in conversion to the weight of metal oxide. Such decomposing organic carbons are thus decomposed to dissipate by ultraviolet radiation outdoors, giving no practical problems. If zirconium or tin compounds are contained 3% by weight or more in conversion to the weight of metal oxide in a photocatalyst material, the surface of a photocatalyst of titanium oxide is covered so as to reduce photocatalytic activity extremely or targeted photocatalyst effect is not attained until the decomposition of contained decomposing components by oxidation is over. On the other hand, with an addition of less than 0.02% by weight, the alkali resistance of the obtained photocatalyst-carrying structure is insufficient. An addition of 0.02% by weight or more is preferred.

Furthermore, the content of the zirconium or tin compounds in a photocatalyst coating material is preferably 0.02–1% by weight in conversion to the weight of metal oxide because photocatalyst transparency is improved and Haze percentage is below 5% as shown in Examples.

When 0.1–5% by weight, to the whole photocatalyst coating material, of a silicon-modified resin or silane coupler is added to the photocatalyst material, the obtained photocatalyst coating material is excellent in stability and particularly in long-term storage as well as a photocatalyst film adheres well, while the produced photocatalyst-carrying structure keeps high catalytic activity after a film is formed.

Commercially available silicon-acrylic resins or silicon-epoxy resins can be used as the silicon-modified resin. Either a resin dissolved in a solvent or emulsion dispersed in water can be also used. Compounds represented by General Formula: $RSi(X)_3$ or $(R)_2Si(X)_2$, wherein R is an organic group and X is chlorine or an alkoxy, can be used as silane couplers. Examples of R in the formulae are methyl, ethyl, vinyl, γ-glycidoxypropyl, γ-methacryloxypropyl, γ-(2-aminoethyl)aminopropyl, γ-chloropropyl, γ-mercaptopropyl, γ-aminopropyl and γ-acryloxypropyl. A compound can be used when X is an alkoxy of 1–5 carbons such as methoxy, ethoxy and β-methoxyethoxy in addition to chlorine.

It is preferable to add 0.1–5% by weight of a silicon-modified resin or silane coupler, as solid matter, to a photocatalyst coating material. An effect is weak on increasing adhesiveness after a boiling water test is carried out if added less than 0.1% by weight. If added more than 5% by weight, photocatalytic activity is reduced. A silicon-modified resin or silane coupler may be added in various ways such as adding into a photocatalyst sol solution or adding into a solution of metal oxide or hydroxide sol added together with a photocatalyst. An addition of a silicon-modified resin of emulsion type into the above-mentioned sol solution is particularly preferred because photocatalyst adhesion is strengthened with hardly decreasing photocatalytic activity. There are no problems if additives such as cross-linking agent are contained.

A photocatalyst of any form, such as powder, sol or solution, can be used in the present invention, if it adheres firmly on a substrate and has photocatalytic activity when dried at the drying temperature of a photocatalyst coating material. Photocatalyst transparency is improved and linear transmittance becomes high when a photocatalyst sol of 5–40 nm in particle diameter, preferably 5–10 nm, is used. Photocatalyst sols are particularly preferred when applied onto glass substrates or plastic moldings that need transparency. A transparent photocatalyst such as that mentioned above is also preferred to apply onto a colored or pattern-printed ground carrier so as not to damage the color or pattern.

Examples of photocatalysts used in photocatalyst coating materials in accordance with this invention are $TiO_2$, ZnO, $SrTiO_3$, CdS, GaP, InP, GaAs, $BaTiO_3$, $K_2NbO_3$, $Fe_2O_3$, $Ta_2O_5$, $WO_3$, $SnO_2$, $Bi_2O_3$, NiO, $Cu_2O$, SiC, $SiO_2$, $MoS_2$, InPb, $RuO_2$ and $CeO_2$, and metals such as Pt, Rh, $RuO_2$, Nb, Cu, Sn, Ni and Fe and oxides of these metals which are added to the said photocatalysts. Among them, a photocatalyst containing titanium oxide as a main component is most suitable from the viewpoint of catalytic activity, stability and cost.

The photocatalyst mentioned above is desirable to be a water-dispersible sol of 5–40 nm in diameter of crystal particles in order to disperse it into a coating material uniformly for better adhesiveness after coating. A preferred amount of a photocatalyst in a photocatalyst coating material is 0.5% by weight or more and 10% by weight or less, as solid matter, to the coating material. Photocatalytic activity is low if an amount of less than 0.5% by weight is added. The more a photocatalyst is added, the higher the catalytic activity. An amount of 10% by weight or less is preferred from the viewpoint of adhesiveness.

It is possible to use water alone as a solvent for a photocatalyst coating material. Alcohol may be added to improve wettability to the substrate and drying speed. An addition of a large quantity of alcohol is not good since the dispersibility of a sol of titanium oxide or metal oxide is lowered to cause precipitation easily. A range between 100/0 to 20/80 in a ratio by weight of water/alcohol is preferably used. A proper mixing ratio should be selected depending on conditions such as a coating method employed, quality of a substrate used and drying temperature. Alcohol such as methanol, ethanol, n-propanol and isopropanol, which can be mixed with water at an arbitrary ratio, can be preferably used alone or as a mixture thereof.

For the purposes of improving the dispersibility and stability of components in a coating material and forming a uniform film when applied, it is desirable to further add 0.0001–1% by weight of a surface active agent to the photocatalyst coating material. An amount of a surface active agent added greatly differs depending on a surfactant used. An addition of less than 0.0001% by weight may result in non-uniform film or precipitation in the coating material due to poor effect on improvement of dispersibility and stability. On the other hand, if added more than 1% by weight, the quantity of a surfactant is too large. Catalytic activity is greatly decreased and alkali resistance is reduced. Commercially available surface active agents can be used. Preferred are surfactants containing no metal ions such as non-ionic polyoxyethylene, polyoxypropylene, glycol ester and glycerol ester, aliphatic amines and amides and fluorine surfactants.

A photocatalyst-carrying structure with excellent durability according to the present invention has a structure with an adhesive layer between a photocatalyst layer obtained by applying and drying the above-mentioned photocatalyst coating material and a carrier. The adhesive layer between the photocatalyst layer and carrier protects the substrate carrier from deterioration due to photocatalytic action and strongly adheres the photocatalyst layer onto the carrier. The adhesive layer itself resists to deterioration due to photocatalytic action.

Materials used for the adhesive layer are silicon-modified resins such as acrylic-silicon resins containing 2–60% by weight of silicon, epoxy-silicon resins and polyester-silicon resins; resins containing 3–60% by weight of polysiloxane; or resins containing 5–40% by weight of colloidal silica. These resins are suitable to adhere a photocatalyst strongly and to protect a carrier from the photocatalyst. Adhesion with the photocatalyst layer is poor and the photocatalyst layer is easily exfoliated due to the deterioration of the adhesive layer by the photocatalyst when a silicon-modified resin, such as an acrylic-silicon resin, containing less than 2% by weight of silicon, a resin containing less than 3% by weight of polysiloxane or a resin containing less than 5% by weight of colloidal silica is used. Adhesion between the adhesive layer and carrier is poor and wear resistance is bad because of low hardness of the adhesive layer if a silicon-modified resin, such as an acrylic-silicon resin, containing more than 60% by weight of silicon is added. The photocatalyst is easily exfoliated from the carrier since the adhesive layer becomes porous or adhesion between the carrier and adhesive layer becomes poor if a resin containing more than 60% by weight of polysiloxane or a resin containing more than 40% by weight of colloidal silica is added.

Silicon can be introduced into a resin by various methods such as an ester exchange reaction, graft reaction using silicon macromers or reactive silicon monomers, hydrosilylation reaction and block copolymerization, when a resin used for the adhesive layer is a silicon-modified resin, such as an acrylic-silicon resin, epoxy-silicon resin or polyester-silicon resin. A silicon-modified resin obtained by any of the said methods can be used as an adhesive layer resin. Examples of silicon introducing resins are acrylic, epoxy, polyester, alkyd and urethane. Among them, acrylic, epoxy and polyester resins are most suitable in terms of forming film, toughness and adhesion with a carrier. These resins can be used either by dissolving in a solvent or in the form of emulsion. There are no problems if additives such as cross-linking agents are added.

When an adhesive layer resin contains polysiloxane which is a hydrolysate of silicon alkoxide having an alkoxy of 1–5 carbons or a product produced from the said hydrolysate, a photocatalyst-carrying structure is obtained with improved adhesiveness and durability. If the number of carbons of the alkoxy group of silicon alkoxide exceeds 6, compounds become expensive. Besides, a hydrolysis speed of the silicon alkoxide is very slow so that it is difficult to harden polysiloxane in the resin. As a result adhesiveness and durability become poor. Polysiloxane obtained by hydrolyzing a silicon alkoxide containing chlorine partially can be used. The use of polysiloxane containing a large quantity of chlorine results in corrosion of the carrier or poor adhesiveness due to impurity chlorine ions.

Preferred polysiloxane compounds to be used are those represented by Formula [II]

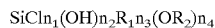  Formula [II]

wherein $R_1$ is an alkyl of 1–8 carbons, which may be substituted by amino, carboxyl or chlorine, such as methyl, ethyl, propyl, isopropyl, butyl, s-butyl, t-butyl, hexyl, octyl, aminomethyl, aminoethyl, carboxymethyl, carboxyethyl, chloromethyl, chloroethyl and chloropropyl; and $R_2$ is an alkyl of 1–8 carbons such as methyl, ethyl, propyl, isopropyl, butyl, s-butyl, t-butyl and hexyl or an alkyl of 1–8 carbons and substituted by an alkoxy group such as methoxymethyl, ethoxymethyl, propoxymethyl, isopropoxymethyl, butoxymethyl, methoxyethyl, ethoxyethyl, propoxyethyl, methoxypropyl and methoxybutyl. $n_1$, $n_2$ and $n_3$ are 0, 1 or 2, $n_4$ is an integer between 2 and 4 and $n_1+n_2+n_3+n_4=4$.

Preferred examples of silicon alkoxides of Formula [II] are $Si(OCH_3)_4$, $Si(OC_2H_5)_4$, $Si(OC_3H_7)_4$, $Si(OC_4H_9)_4$, $Si(OC_5H_{11})_4$, $Si(OC_6H_{13})_4$, $SiCH_3(OCH_3)_3$, $SiCH_3(OC_2H_5)_3$, $SiCH_3(OC_3H_7)_3$, $SiCH_3(OC_3H_7)_3$, $SiCH_3(OC_4H_9)_3$, $SiCl(OCH_3)_3$, $SiCl(OC_2H_5)_3$, $SiCl(OC_3H_7)_3$, $SiCl(OC_4H_9)_3$, $SiCl(OC_6H_{13})_3$, $SiCl(OH)(OCH_3)_2$, $SiCl(OH)(OC_2H_5)_2$, $SiCl(OH)(OC_3H_7)_2$, $SiCl(OH)(OC_4H_9)_2$, $SiCl_2(OCH_3)_2$ and $SiCl_2(OC_2H_5)_2$.

There are various methods to introduce polysiloxane into a resin. For example, a silicon alkoxide monomer is mixed with a resin solution and hydrolyzed with moisture in the air when an adhesive layer is formed, and a product of partially hydrolyzed silicon alkoxide is mixed with a resin beforehand and hydrolyzed with moisture in the air when an adhesive layer is formed. Any methods able to mix with a resin uniformly can be employed. A small amount of an acid or base catalyst can be added to change the hydrolysis speed of silicon alkoxide. Polysiloxane of 3–60% by weight is preferably added to a resin in order to strongly adhere a photocatalyst layer onto a carrier. An amount of 3–40% by weight is particularly preferred to improve alkali resistance. Polysiloxane can be introduced into any resin such as an acrylic resin, acrylic-silicon resin, epoxy-silicon resin, polyester-silicon resin, silicon-modified resin, urethane resin, epoxy resin, polyester resin and alkyd resin. Silicon-modified resins including an acrylic-silicon resin, epoxy-silicon resin, polyester-silicon resin and a mixture of these resins are most suitable in terms of durability and alkali resistance.

Colloidal silica of smaller than 10 nm in particle diameter is preferred when a resin containing colloidal silica is used for an adhesive layer. If larger than 10 nm, the resin in the adhesive layer is easily deteriorated by the photocatalyst and adhesion between the photocatalyst and adhesive layers becomes poor. The simplest method to introduce the said colloidal silica into a resin is to mix a resin solution with a colloidal silica solution, followed by applying and drying to form a protective film. In addition, a product synthesized by polymerizing a resin with dispersed colloidal silica can be used. Colloidal silica may be treated with a silane coupler in order to improve the adhesiveness and dispersibility between colloidal silica and a resin.

An amount of colloidal silica to add to a resin is preferably 5–40% by weight in order to strongly adhere a photocatalyst layer onto a carrier. To improve alkali resistance, 5–20% by weight is particularly preferred. Colloidal silica can be introduced to any resin such as an acrylic resin, acrylic-silicon resin, epoxy-silicon resin, silicon-modified resin, urethane resin, epoxy resin, polyester resin and alkyd resin. Silicon-modified resins including an acrylic-silicon resin, epoxy-silicon resin or polyester-silicon resin are most suitable in terms of durability and alkali resistance. Any type of colloidal silica can be used, for example, silica sol obtained by cation exchange of an aqueous solution of sodium silicate or silica sol produced by the hydrolysis of silicon alkoxide.

In case a resin containing colloidal silica or polysiloxane is used for the adhesive layer, the colloidal silica or polysiloxane is preferred to be smaller than 10 nm in particle diameter. If larger than 10 nm, dispersibility becomes poor and the light transmittance of the adhesive layer is decreased. Thus the whole light transmittance through the adhesive and photocatalyst layers altogether at a wavelength of 550 nm may be below 70%.

A photostabilizing agent and/or ultraviolet absorbent can be mixed into an adhesive layer resin for the purpose of controlling deterioration by photocatalytic activity. Hindered amine compounds are good at using as photostabilizing agents. Other agents can be also used. Triazole compounds can be used as ultraviolet absorbents. An amount to add to the resin is 0.005% by weight or more and 10% by weight or less, preferably 0.01% by weight or more and 5% by weight or less. Treatment of the surface of the adhesive layer with a silane or titanium coupler may improve the adhesion with the photocatalyst layer.

Examples of methods to adhere an adhesive layer onto a carrier are coating a resin solution by such a method as printing, sheet molding, spray blowing, dipping and coating or spin coating, followed by drying. In general drying temperature is preferably 50° C. or above and 300° C. or below though it differs depending on a type of solvent or resin used. An adhesive layer is desirably 0.1 $\mu$m or thicker and 20 $\mu$m or thinner for the purpose of attaining good adhesion with a photocatalytic layer. If the adhesive layer is thinner than 0.1 $\mu$m, an action to adhere the photocatalyst layer strongly becomes weak. There are no particular problems if thicker than 20 $\mu$m. A layer of thicker than 20 $\mu$m has few advantages in consideration to practical coating processes.

A photocatalyst coating material of this invention can be applied onto a carrier with an adhesive layer, which is produced according to the method mentioned above, in order to form a photocatalyst film. It can be done by an ordinary coating method such as dipping, bar coating, spray blowing, screen printing, gravure printing, roll coating, transcription printing, doctor blading, brush coating and spin coating. Drying temperature at applying a photocatalyst coating material is preferably 50° C. or above and 300° C. or below, though it differs depending on a carrier material used.

The thicker the photocatalyst coating film obtained by using a photocatalyst coating material of the present invention, the higher photocatalytic activity is. However, there is hardly any change in the activity if it is thicker than 5 $\mu$m. A thinner coat transmits more light and the catalyst layer becomes inconspicuous, being thus preferred. If the film is thinner than 1 $\mu$m, ultraviolet rays utilized by the photocatalyst passes through. High catalytic activity cannot be accomplished. A photocatalyst layer with more than 70% of the whole light transmittance at the wavelength of 550 nm is obtained when a photocatalyst layer is made 0.1 $\mu$m or thicker and 5 $\mu$m or thinner and photocatalyst particles of smaller than 40 nm in diameter of crystal particle and a gel of metal oxide or hydroxide with a specific surface area of 100 $m^2/g$ or more are used. If a structure carrying a photocatalyst layer has more than 70% of the whole light transmittance at the wavelength of 550 nm, visible rays transmitting through the structure can be used as lighting in case a transparent carrier is used. Even if a carrier is opaque, a structure of the present invention is useful in decoration since any patterns on the carrier are not damaged.

A photocatalyst film can be formed with the photocatalyst coating material on a carrier of any complex shape such as particle, film, plate, tube, fiber and net. The photocatalyst coating material of the present invention may have poor adhesion, if used alone, depending on a substrate used. An adhesive layer can be set between the substrate and the photocatalyst layer. With the adhesive layer, a photocatalyst-carrying structure can be produced with excellent adhesiveness and high photocatalytic activity as well as excellent durability so as to be used outdoors. In particular, a photocatalyst-carrying structure with both excellent adhesiveness and high photocatalytic activity can be produced by applying a resin such as a silicon-modified resin, a resin containing polysiloxane or a resin containing colloidal silica, as an adhesive layer between a photocatalyst layer and carrier, on various general-purpose plastic substrates such as polyester, polyurethane, acrylic, nylon and PVC.

A substrate is preferably 10 $\mu$m or more in size in order to strongly adhere a photocatalyst layer onto the substrate with the photocatalyst coating material of this invention. Organic polymers, which cannot be heated when a photocatalyst is adhered, and metals, which are easily oxidized to corrode by heat or water, can be used to produce a structure with a photocatalyst by applying the photocatalyst coating material. A carrier whose surface is treated by corona discharge or with a primer can be also used to improve the adhesion between the photocatalyst layer and carrier.

The photocatalyst coating materials of this invention as well as photocatalyst-carrying structures according to the present invention and produced by using the said coating material are preferably used on easily soiled surfaces, such as interior/exterior paints for buildings, outside mortar walls of buildings, aluminum frames, braided door braids, aluminum exterior panels, wall papers, window panes, window panes for transport vehicles, blinds, curtains, carpets, indoor/outdoor lighting equipment, indoor/outdoor lighting lights, road lights, tunnel lights, sound-proof highway walls, guard rails, road signs, traffic signs, traffic lights, beacon lights, cones for road separation, adhesive sheets for reflection tapes, road reflection mirrors, lighthouse lights, fluorescent lights, black lights, xenon lamps, chemical lamps, paints for protecting ship bottom and fish nets from soiling, fillers for water treatment, PVC film for agricultural use, sheets to protect from weeds, shattering-resistant glass film, various cards, packs for packaging and packaging film, for the purpose of antifouling, sterilization, decomposition of attached dirt and decrease in the number of cleanings. This invention provides photocatalyst-carrying structures applicable particularly in an environment of high temperature and humidity or outdoors.

BEST MODE FOR CARRYING OUT THE INVENTION

This invention is further described in detail with reference to examples. The present invention is not restricted by the examples.

1) Evaluation of Photocatalytic Activity

A sample carrying a photocatalyst and of 70 mm×70 mm in size was placed in a 4-liter Pyrex glass container. A mixed gas of air and aldehyde was introduced into the container so that aldehyde concentration was 500 ppm. The sample was irradiated with black light (FL 15BL-B, Matsushita Electric Industry Co., Ltd.) of 2 mW/$cm^2$ of ultraviolet intensity for 2 hours. The concentration of aldehyde gas in the container was measured by gas chromatography. Photocatalytic activity was evaluated based on an amount of decrease in the aldehyde concentration. Evaluation criteria follow:

| Aldehyde gas concentration after 2-hour irradiation | Grade |
|---|---|
| Less than 50 ppm | A |
| 50–200 ppm | B |
| 200–300 ppm | C |
| 300–450 ppm | D |
| More than 450 ppm | E |

2) Evaluation of Adhesiveness

Adhesiveness was evaluated according to the cross-cut Scotch tape test defined in JIS K5400. Cuts are 2 mm apart. The number of squares is 25. Scores were counted according to the criterion described in JIS K5400.

3) Alkali Resistance Test

Two test samples of 70 mm×150 mm in size and carrying a photocatalyst were each coated with a commercially available tar epoxy paint on the surface and back face of the periphery of 5 mm from the edge. They were sufficiently dried under prescribed conditions, immersed up to 120 mm from the bottom in a polyethylene beaker containing an aqueous solution of 5% by weight of sodium carbonate, and stood at room temperature for 24 hours. The samples were taken out, sufficiently washed with distilled water to remove attached aqueous solution of sodium carbonate, wiped lightly with absorbent cotton and dried at room temperature for 2 hours. The portion contacted with the aqueous solution of sodium carbonate was compared visually with a non-treated sample according to the criterion defined in JIS K5400. Conditions for passing the test are that none of the two samples is swollen, cracked, peeled off, pinholed and softened, that the immersed solution is not turbid and has no color change and that the luster and color change of the test pieces are not much different from those of a non-treated piece.

4) Measurement of Whole Light Transmittance

Whole light transmittance of a sample carrying an adhesive layer and photocatalyst layer was measured at the wavelength of 550 nm by an automatically-recording spectrophotometer (U-4000, Hitachi Seisakusho Co., Ltd.) with reference to a carrier having no layers.

5) Evaluation of Durability

A sample carrying a photocatalyst layer was irradiated with black light of 3 mW/cm$^2$ of ultraviolet intensity for 500 hours in a thermo-hydrostat set to 40° C. and 90% R.H. Adhesiveness was measured according to the cross-cut Scotch tape test defined in JIS K5400 in order to evaluate durability. Scores are the same as those for adhesiveness.

6) Accelerated Weathering Test by Sunshine Carbon Arc Weather Meter

An accelerated weathering test by a sunshine carbon arc weather meter, defined in JIS K5400, was carried out using a meter, WEL-SUN-HCN of Suga Shikenki Co., Ltd. Test conditions were 500 hours, black panel temperature of 63° C., 120-minute cycle and 18-minute raining. Three samples after the test were checked visually for swelling, cracking, exfoliating, whitening and surface changes in comparison with an original sample before the accelerated weathering test. Evaluation criteria are described below:

<Evaluation Criteria>

A) All of the 3 test pieces have no changes.

B) Slight changes are recognized on 1–2 pieces out of the 3 test pieces.

C) Slight changes are recognized on all of the 3 test pieces or a big change is apparently recognized on 1–2 pieces.

An adhesiveness test was carried out by the cross-cut Scotch tape test with cuts of 2 mm apart according to the method defined in JIS K5440 before and after the accelerated weathering test was performed.

7) Pencil Hardness Measurement

Pencil hardness defined in JIS K5400 was measured using a pencil hardness tester (C221A, Yoshimitsu Seiki Co., Ltd.) with a weight of 1 kg. The trace was observed visually.

9) Antibacterial Test

A sample cut to 5-cm square was disinfected with 80% ethanol and sterilized by drying at 150° C. *Escherichia coli* was cultured and diluted to prepare a solution of the concentration of $10^5$/ml beforehand. On the surface of the sample was dropped 0.2 ml of the bacteria solution. Three sets of four samples thus prepared were separately set in an incubator. A set was irradiated with black light (15 W×2 lights, distance from the light source: 10 cm), another set was irradiated with fluorescent lamps (15 W×2 lamps, distance from the light source: 10 cm) and the third was kept in the dark with no irradiation. After 1, 2, 3 or 4 hours, a sample was taken out and wiped with sterilized gauze, which was immersed in sterilized physiological saline beforehand, for removing the bacteria solution. The gauze used was placed in 10 ml of sterilized physiological saline and stirred sufficiently. The supernatant of the bacteria solution was planted in an agar culture in a Petri dish of 95 mm in diameter, which was sterilized in an autoclave beforehand, and cultured at 36° C. for 24 hours. Then the number of *E coli* colonies was counted. The same process as mentioned above was repeated to prepare reference samples except keeping under daylight. The number of *E coli* colonies counted was used as a standard to calculate a survival rate for each sample kept in the dark with no irradiation, irradiated with black light or irradiated with fluorescent lamps, after taken out at a prescribed time.

EXAMPLES

The following materials were used for carriers:

(TA) Polyester film treated with primer (TB) Soda lime glass plate (TC) Rigid PVC sheet (TD) Transparent acrylic plate (TE) Aluminum plate The following were used as polysiloxane to be contained in an adhesive layer:

(PS-1) Silicon tetramethoxide monomer (Shin-etsu Kagaku Co., Ltd.)

(PS-2) Polymethoxy siloxane (Colcoat Co., Ltd.; Trade name: Methyl Silicate 51)

(PS-3) Polyethoxy siloxane (Colcoat Co., Ltd.; Trade name: Ethyl Silicate 40)

The following were used as colloidal silica to be contained in an adhesive layer:

(KS-1) Trade name: Cataloid SI-350 (Shokubai Kasei Co., Ltd.), particle diameter: 7–9 nm (KS-2) Trade name: Snowtex ST-XS (Nissan Chemical Industry Co., Ltd.), particle diameter: 4–6 nm The following were used as resin solutions for introducing polysiloxane or colloidal silica. The silicon content is written in conversion to the weight of $SiO_2$ in solid matter of the resin.

(J-1) Xylene solution of acrylic-silicon resin with 3% by weight of silicon (J-2) Xylene isopropanol solution of acrylic-silicon resin with 10% by weight of silicon (J-3) Aqueous solution of acrylic-silicon emulsion resin with 3% by weight of silicon (J-4) Aqueous solution of acrylic-silicon emulsion resin with 10% by weight of silicon (J-5) Methyl ethyl ketone solution of epoxy-silicon resin with 3% by weight of silicon
(J-6) Ethyl acetate solution of polyester-silicon resin with 3% by weight of silicon
(J-7) Aqueous solution of acrylic emulsion resin Polysiloxane or colloidal silica was mixed with a resin solution and the concentration was adjusted to give a solution for forming an adhesive layer. An adhesive layer was formed by a dipping method when a carrier was thinner than 2 μm or was other than a plate in shape. A baker applicator was used when a carrier was a plate in shape and was thicker than 2 μm. The adhesive layer was dried at 80° C. for the carriers of (TC) and (TD) and at 120° C. for other carriers.

The following were used as photocatalysts:
(C-1) Titanium oxide fine powder (Nippon Aerosil Co., Ltd., Trade name: P-25, crystal particle: 27 nm in diameter
(C-2) Titanium oxide sol acidified with nitric acid (crystal particle: 8 nm in diameter)

The following sols of metal oxides or hydroxides were used as photocatalyst binders to adhere with a photocatalyst and the following sol or compound solutions for zirconium or tin compounds as agents to give durability and particularly alkali resistance.
(Z-1) Silica sol: Shokubai Kasei Co., Ltd., Trade name—Cataloid SI-30, Specific surface area after drying at 150° C.: 180 m²/g.
(Z-2) Alumina sol: Nissan Chemical Industry Co., Ltd., Trade name—Alumina sol, Specific surface area after drying at 150° C.: 400 m²/g.
(Z-3) Niobium oxide sol: An aqueous solution of niobium oxalate (CBMM Co., Ltd.) was neutralized with 10% aqueous ammonia, dried at 150° C., then deflocculated with an aqueous solution of diluted nitric acid. The deflocculated product was further dried at 150° C. and had a specific surface area of 60 m²/g.
(Z-4) Zirconia sol: Zirconium tetrabutoxide (TBZR; Nippon Soda Co., Ltd.) was hydrolyzed in ethanol, dried at 150° C., heated at 200° C.–350° C. and deflocculated with an aqueous solution of diluted nitric acid. The deflocculated product was further dried at 150° C. and had a specific surface area of 50–100 m²/g.
(Z-5) Tin oxide sol: A 1% aqueous solution of tin oxide (Wako Junyaku Co., Ltd.) was neutralized with an aqueous solution of 1N sodium hydroxide. The precipitate produced was separated by decantation, repeatedly washed with ion-exchanged water and dried. It was again dispersed in ion-exchanged water by ultrasonic dispersion equipment and stood alone for a day and a night. The supernatant was separated to give a solution of tin oxide sol containing 1% of solid matter. After this sol solution was dried at 150° C., the specific surface area was 80–120 m²/g.
(Z-6) Zirconium oxynitrate-1: To a 10% ethanol solution of zirconium tetrabutoxide (TBZR, Nippon Soda Co., Ltd.) was added 61% nitric acid containing nitrate ions twice in mole the number of zirconium atoms. Water of half an amount of the resulting solution was added to complete hydrolysis. The organic portion was distilled under reduced pressure. The obtained solution was used as a zirconium oxynitrate solution.
(Z-7) Zirconium oxynitrate-2: Zirconium oxynitrate hexahydrate (Wako Junyaku Co., Ltd., pure reagent grade) was dissolved in water to make a 10% aqueous solution and heated for 12 hours to remove a half of the water at atmospheric pressure. The obtained solution was diluted with an equal amount of water for using as a zirconium oxynitrate solution.

The following solutions were used as a silicon alkoxide and silane couplers.
(S-1) Ethanol solution of 5% by weight of silicon tetraethoxide (Shin-etsu Kagaku Co., Ltd.)
(S-2) Ethanol solution of 5% by weight of silane coupler (Nippon Uniker Co., Ltd., Trade name: A-117)
(S-3) Aqueous solution of acrylic-silicon emulsion resin containing 3% by weight of silicon Examples 1–25

A photocatalyst of (C-1) or (C-2), a metal oxide or hydroxide sol of (Z-1) to (Z-3) as a photocatalyst binder, a zirconium or tin compound solution of (Z-4) to (Z-7) as an agent to endow alkali resistance and a silicon compound of (S-1) to (S-3), and a surface active agent if necessary, were mixed by stirring in solvents shown in Table 1 for 30 minutes at room temperature.

Compositions of each component are shown in Table 1.

TABLE 1

| | Photocatalyst *1 | | MOx/ M(OH)x sol | | Zr/Sn compound *1 | | Silicone coupler | | Surfactant | Solvent ratio by weight | |
|---|---|---|---|---|---|---|---|---|---|---|---|
| | type | qty *2 | type | qty *2 | type | qty *3 | type | qty | qty | H₂O | ROH |
| Example 1 | C-1 | 3.2 | Z-1 | 3.2 | Z-4 | 1.6 | — | | 0.004 | 50 | 50 *4 |
| Example 2 | C-1 | 4 | Z-1 | 3.2 | Z-4 | 0.8 | — | | 0.01 | 50 | 50 *4 |
| Example 3 | C-1 | 2.4 | Z-1 | 2.4 | Z-4 | 0.8 | — | | 0.0008 | 50 | 50 *4 |
| | | | Z-2 | 0.8 | | | | | | | |
| Example 4 | C-1 | 0.5 | Z-1 | 0.4 | Z-5 | 0.021 | — | | 0.0002 | 50 | 50 *4 |
| | | | Z-2 | 0.1 | | | | | | | |
| Example 5 | C-1 | 8 | Z-1 | 6.4 | Z-5 | 1.6 | — | | 0.004 | 80 | 20 *4 |
| Example 6 | C-1 | 4 | Z-1 | 2.8 | Z-4 | 0.4 | — | | 0.001 | 60 | 40 *4 |
| | | | | | Z-5 | 0.8 | | | | | |
| Example 7 | C-1 | 1.6 | Z-1 | 4 | Z-4 | 2 | — | | 0.004 | 50 | 50 *4 |
| | | | | | Z-5 | 0.4 | | | | | |
| Example 8 | C-1 | 0.5 | Z-1 | 0.38 | Z-4 | 0.08 | S-2 | 0.5 | 0.002 | 50 | 50 *4 |
| | | | Z-2 | 0.12 | Z-5 | 0.08 | | | | | |
| Example 9 | C-2 | 3.2 | Z-1 | 2.4 | Z-4 | 0.4 | — | | 0.004 | 50 | 50 *4 |
| | | | Z-2 | 2 | | | | | | | |
| Example 10 | C-2 | 4 | Z-1 | 2.4 | Z-4 | 0.8 | S-1 | 0.2 | 0.004 | 50 | 50 *4 |
| | | | Z-2 | 0.8 | | | | | | | |
| Example 11 | C-2 | 0.5 | Z-1 | 0.8 | Z-4 | 0.4 | — | | 0.01 | 80 | 20 *4 |
| | | | Z-2 | 0.3 | | | | | | | |

TABLE 1-continued

| | Photo-catalyst *1 | | MOx/ M(OH)x sol | | Zr/Sn compound *1 | | Silicone coupler | | Surfactant qty | Solvent ratio by weight | |
|---|---|---|---|---|---|---|---|---|---|---|---|
| | type | qty *2 | type | qty *2 | type | qty *3 | type | qty | | H$_2$O | ROH |
| Example 12 | C-2 | 4.8 | Z-1 | 2.4 | Z-4 | 0.4 | — | | 0.1 | 100 | |
| | | | Z-2 | 0.8 | | | | | | | |
| Example 13 | C-1 | 0.6 | Z-1 | 0.7 | Z-4 | 0.02 | S-1 | 0.1 | 0.004 | 20 | 80 *4 |
| | | | Z-2 | 0.2 | Z-5 | 0.02 | | | | | |
| Example 14 | C-1 | 4 | Z-1 | 3.2 | Z-5 | 0.4 | S-2 | 0.4 | 0.004 | 40 | 60 *4 |
| Example 15 | C-1 | 1.6 | Z-1 | 4.8 | Z-4 | 0.8 | — | | 0.04 | 30 | 70 *4 |
| | | | | | Z-5 | 0.8 | | | | | |
| Example 16 | C-2 | 2.4 | Z-1 | 2.4 | Z-4 | 0.8 | S-2 | 2.0 | 0.008 | 50 | 50 *4 |
| | | | Z-2 | 0.4 | | | | | | | |
| Example 17 | C-2 | 1 | Z-1 | 0.5 | Z-4 | 0.17 | — | | 0.0002 | 50 | 50 *4 |
| Example 18 | C-2 | 1.6 | Z-1 | 4.8 | Z-4 | 0.8 | — | | 0.004 | 50 | 50 *4 |
| | | | | | Z-5 | 0.8 | | | | | |
| Example 19 | C-2 | 3.2 | Z-1 | 4.4 | Z-6 | 0.4 | — | | 0.004 | 50 | 50 *5 |
| Example 20 | C-2 | 4.0 | Z-1 | 3.2 | Z-6 | 0.6 | S-1 | 4 | 0.004 | 60 | 40 *6 |
| | | | Z-3 | 0.16 | | | | | | | |
| Example 21 | C-2 | 1.0 | Z-1 | 0.9 | Z-6 | 0.05 | — | | 0.004 | 50 | 50 *4 |
| | | | Z-3 | 0.1 | | | | | | | |
| Example 22 | C-2 | 0.5 | Z-1 | 0.5 | Z-7 | 0.05 | — | | 0.004 | 80 | 20 *6 |
| Example 23 | C-2 | 1.0 | Z-1 | 1.6 | Z-7 | 0.1 | S-1 | 0.1 | 0.004 | 70 | 30 *7 |
| | | | Z-2 | 0.2 | | | | | | | |
| Example 24 | C-2 | 4 | Z-1 | 3.36 | Z-6 | 0.32 | — | | 0.004 | 40 | 60 *5 |
| | | | | | Z-7 | 0.32 | | | | | |
| Example 25 | C-2 | 4 | Z-1 | 3.8 | Z-7 | 0.2 | S-1 | 0.5 | 0.004 | 40 | 60 *4 |
| Comparison Example 1 | C-1 | 0.4 | Z-1 | 0.4 | Z-4 | 0.008 | — | | 0.001 | 60 | 40 *4 |
| | | | | | Z-5 | 0.008 | | | | | |
| Comparison Example 2 | C-1 | 3.2 | Z-1 | 3.2 | — | — | — | | 0.002 | 50 | 50 *4 |
| | | | Z-2 | 0.8 | | | | | | | |
| Comparison Example 3 | C-1 | 3.2 | Z-1 | 3.2 | Z-4 | 1.6 | — | | 0.2 | 20 | 80 *4 |
| Comparison Example 4 | C-1 | 15 | Z-1 | 10 | — | — | — | | — | 50 | 50 *4 |
| Comparison Example 5 | C-2 | 0.3 | Z-1 | 0.3 | Z-4 | 0.01 | — | | 0.004 | 50 | 50 *4 |
| Comparison Example 6 | C-2 | 4 | Z-1 | 4 | Z-4 | 4 | S-1- | 0.1 | 0.004 | 70 | 30 *4 |
| Comparison Example 7 | C-2 | 4 | Z-1 | 4 | Z-4 | 4 | — | | 0.04 | 70 | 30 *6 |
| Comparison Example 8 | C-2 | 4 | Z-1 | 4 | Z-4 | 1 | — | | — | 10 | 90 *6 |

*1 An amount of each component is an addition amount to 100 parts of solvents (% by weight).
*2 Content as solid matter.
*3 Amount in conversion to the weight of an oxide.
*4 Ethanol
*5 Methanol
*6 Isopropanol
*7 n-Propanol Examples 26–50

A coating material composite for an adhesive layer in Reference Examples 1–25 was applied and dried. A photocatalyst coating material shown in Examples 1–25 was then applied and dried to give a photocatalyst-carrying structure of 26–50.

A photocatalyst layer was formed by a dipping method when a carrier is thinner than 2 μm or is other than a plate in shape. A bar coater was used when a carrier is a plate and the layer is thicker than 2 μm.

Table 2 shows compositions of adhesive and photocatalyst layers and thickness of each layer.

Table 3 shows compositions of adhesive-layer coating materials

The photocatalytic activity, adhesiveness, alkali resistance, the results of sunshine weather meter test, whole light transmittance and Haze percentage of the obtained photocatalyst-carrying structure are shown in Table 4.

TABLE 2

| Example | Carrier | Adhesive layer coating material | Photo-catalyst coating material | Adhesive layer *1 | Photo-catalyst layer *1 |
|---|---|---|---|---|---|
| Example 26 | TA | Reference Example 1 | Example 1 | 5 | 3 |
| Example 27 | TB | Reference Example 2 | Example 2 | 5 | 3 |
| Example 28 | TA | Reference Example 3 | Example 3 | 3 | 2 |
| Example 29 | TB | Reference Example 4 | Example 4 | 3 | 0.1 |
| Example 30 | TC | Reference Example 5 | Example 5 | 2 | 2 |
| Example 31 | TB | Reference Example 6 | Example 6 | 3 | 2 |
| Example 32 | TA | Reference Example 7 | Example 7 | 2 | 1 |
| Example 33 | TB | Reference Example 8 | Example 8 | 0.3 | 0.1 |

TABLE 2-continued

| Example | Carrier | Adhesive layer coating material | Photo-catalyst coating material | Adhesive layer *1 | Photo-catalyst layer *1 |
|---|---|---|---|---|---|
| Example 34 | TC | Reference Example 9 | Example 9 | 3 | 1 |
| Example 35 | TD | Reference Example 10 | Example 10 | 3 | 3 |
| Example 36 | TB | Reference Example 11 | Example 11 | 2 | 0.2 |
| Example 37 | TA | Reference Example 12 | Example 12 | 5 | 3 |
| Example 38 | TA | Reference Example 13 | Example 13 | 2 | 0.2 |
| Example 39 | TB | Reference Example 14 | Example 14 | 3 | 2 |
| Example 40 | TC | Reference Example 15 | Example 15 | 3 | 1 |
| Example 41 | TB | Reference Example 16 | Example 16 | 5 | 5 |
| Example 42 | TD | Reference Example 17 | Example 17 | 5 | 3 |
| Example 43 | TE | Reference Example 18 | Example 18 | 5 | 2 |
| Example 44 | TA | Reference Example 19 | Example 19 | 3 | 1 |
| Example 45 | TA | Reference Example 20 | Example 20 | 2 | 1 |
| Example 46 | TA | Reference Example 21 | Example 21 | 3 | 0.2 |
| Example 47 | TB | Reference Example 22 | Example 22 | 0.5 | 0.1 |
| Example 48 | TB | Reference Example 23 | Example 23 | 1 | 0.5 |
| Example 49 | TB | Reference Example 24 | Example 24 | 3 | 1 |
| Example 50 *2 | TB | — | Example 25 | 2 | 1 |
| Comparison Example 9 | TA | — | Comparison Example 1 | 1 | 0.1 |
| Comparison Example 10 | TB | Comparison Example A | Comparison Example 2 | 2 | 1 |
| Comparison Example 11 | TA | Comparison Example B | Comparison Example 2 | 3 | 2 |
| Comparison Example 12 | TB | Comparison Example C | Comparison Example 3 | 3 | 2 |
| Comparison Example 13 | TC | Comparison Example D | Comparison Example 4 | 2 | 1.8 |
| Comparison Example 14 | TC | Comparison Example D | Comparison Example 5 | 2 | 0.1 |
| Comparison Example 15 | TC | Comparison Example D | Comparison Example 6 | 2 | 1 |
| Comparison Example 16 | TC | Comparison Example D | Comparison Example 7 | 2 | 1 |
| Comparison Example 17 | TA | Comparison Example D | Comparison Example 8 | 2 | 1 |

*1 Thickness of layer: μm
*2 A coating material was applied on a substrate and dried at 200° C. for 30 minutes.

Reference Examples

A resin solution of aforementioned (J-1)–(J-7), a silicon alkoxide or polysiloxane of (PS-1)–(PS-3) and colloidal silica of (KS-1) or (KS-2) were mixed by stirring in a solvent shown in Table 3 at room temperature for 30 minutes in order to prepare a coating material composite for an adhesive layer.

TABLE 3

| | Adhesive layer resin *1 | | Poly-siloxane, Colloidal silica *1 | | Solvent | | Sur-factant *1 |
|---|---|---|---|---|---|---|---|
| | type | qty *2 | type | qty | type | ratio | addition |
| Reference Example 1 | J-1 | 10 | — | — | Xylene | 100 | 0.05 |
| Reference Example 2 | J-1 | 10 | — | — | Xylene | 100 | 0.01 |
| Reference Example 3 | J-1 | 9 | PS-2 | 1 | Xylene Ethanol | 50 50 | 0.03 |
| Reference Example 4 | J-1 | 7.5 | PS-2 | 2.5 | Xylene Ethanol | 50 50 | 0.05 |
| Reference Example 5 | J-2 | 6 | PS-2 | 4 | xylene Ethanol Isopropanol | 40 40 20 | 0.05 |
| Reference Example 6 | J-2 | 9 | PS-3 | 1 | Xylene Ethanol Isopropanol | 40 40 20 | 0.05 |
| Reference Example 7 | J-2 | 8 | PS-3 | 2 | Xylene Ethanol Isopropanol | 40 40 20 | 0.05 |
| Reference Example 8 | J-5 | 7 | PS-2 | 3 | Methyl ethyl ketone Ethanol | 50 50 | 0.05 |
| Reference Example 9 | J-6 | 5.5 | PS-2 | 4.5 | Ethyl acetate Ethanol | 50 50 | 0.1 |
| Reference Example 10 | J-1 | 9 | PS-2 | 1 | Xylene Ethanol | 50 50 | 0.05 |
| Reference Example 11 | J-5 | 8 | PS-2 | 2 | Methyl ethyl ketone Ethanol | 50 50 | 0.005 |
| Reference Example 12 | J-5 | 7 | PS-3 | 3 | Methyl ethyl ketone Ethanol | 50 50 | 0.05 |
| Reference Example 13 | J-3 | 9 | KS-1 | 1 | Water | 100 | 0.05 |
| Reference Example 14 | J-3 | 8 | KS-1 | 2 | Water | 100 | 0.05 |
| Reference Example 15 | J-3 | 7 | KS-2 | 3 | Water | 100 | 0.1 |
| Reference Example 16 | J-4 | 6 | KS-2 | 4 | Water | 100 | 0.1 |
| Reference Example 17 | J-7 | 8 | KS-2 | 2 | Water | 100 | 0.3 |
| Reference Example 18 | J-4 | 7 | KS-2 | 3 | Water | 100 | 0.5 |
| Reference Example 19 | J-1 | 7 | PS-2 | 3 | Xylene Ethanol | 50 50 | 0.01 |
| Reference Example 20 | J-1 | 7 | PS-2 | 3 | Xylene Ethanol | 50 50 | 0.005 |
| Reference Example 21 | J-1 | 7 | PS-2 | 3 | Xylene Ethanol | 50 50 | 0.05 |
| Reference Example 22 | J-1 | 8 | PS-2 | 2 | Xylene Ethanol | 50 50 | 0.05 |
| Reference Example 23 | J-2 | 8 | PS-2 | 2 | Xylene Ethanol | 50 50 | 0.05 |
| Reference Example 24 | J-2 | 8 | PS-2 | 2 | Xylene Ethanol | 50 50 | 0.05 |
| Comparison Example A | J-1 | 3 | PS-2 | 7 | Xylene Ethanol | 50 50 | 0.05 |
| Comparison Example B | J-4 | 5 | KS-2 | 5 | Water | 100 | 0.05 |
| Comparison Example C | J-7 | 9.8 | PS-1 | 0.2 | Xylene Ethanol | 50 50 | 0.05 |
| Comparison Example D | J-1 | 9 | PS-2 | 1 | Xylene Ethanol | 50 50 | 0.05 |

*1 % by weight. Amount of nonvolatile matter added to solvents.
*2 Content as solid matter

TABLE 4

|  | Photo-catalyst activity | Adhesiveness test | | Alkali resistance test | Sunshine weather meter | | Whole light transmittance (%) | Pencil hardness | Heiz coefficient (%) |
| --- | --- | --- | --- | --- | --- | --- | --- | --- | --- |
|  |  | before durability test | after durability test |  | Surface after test | adhesion after test |  |  |  |
| Example 26 | A | 10 | 8 | Passed | A | 8 | 78 | 3H | — |
| Example 27 | A | 10 | 8 | Passed | A | 8 | 76 | 3H | — |
| Example 28 | B | 10 | 8 | Passed | A | 8 | 74 | 3H | — |
| Example 29 | D | 10 | 10 | Passed | A | 8 | 84 | 3H | — |
| Example 30 | A | 10 | 8 | Passed | A | 8 | 78 | 3H | — |
| Example 31 | A | 10 | 10 | Passed | A | 8 | 78 | 3H | — |
| Example 32 | C | 10 | 10 | Passed | A | 10 | 88 | 3H | — |
| Example 33 | D | 10 | 8 | Passed | A | 8 | 92 | 6H | — |
| Example 34 | B | 10 | 8 | Passed | A | 8 | 82 | 3H | — |
| Example 35 | A | 10 | 8 | Passed | A | 8 | 86 | 3H | — |
| Example 36 | C | 10 | 10 | Passed | A | 8 | 85 | 3H | — |
| Example 37 | A | 10 | 8 | Passed | A | 8 | 80 | 3H | — |
| Example 38 | C | 10 | 10 | Passed | A | 8 | 92 | 5H | — |
| Example 39 | A | 10 | 10 | Passed | A | 10 | 87 | 43H | — |
| Example 40 | C | 10 | 10 | Passed | A | 8 | 76 | 3H | — |
| Example 41 | A | 10 | 10 | Passed | A | 10 | 92 | 6H | — |
| Example 42 | A | 10 | 6 | Passed | A | 8 | 76 | 2H | — |
| Example 43 | A | 10 | 10 | Passed | A | 8 | — *3 | 4H | — |
| Example 44 | B | 10 | 10 | Passed | A | 10 | 80 | 3H | — |
| Example 45 | B | 10 | 10 | Passed | A | 10 | 82 | 6H | 4.6 |
| Example 46 | C | 10 | 10 | Passed | A | 10 | 86 | 3H | 4.2 |
| Example 47 | D | 10 | 10 | Passed | A | 10 | 88 | 3H | 2.1 |
| Example 48 | C | 10 | 10 | Passed | A | 10 | 78 | 3H | 1.6 |
| Example 49 | C | 10 | 10 | Passed | A | 10 | 76 | 3H | 2.5 |
| Example 50 | B | 8 | 10 | Passed | A | 8 | 72 | 5H | 4.8 |
| Comparative 9 | D | 2 | 0 | Not passed | C | 0 | 67 | 6B | — |
| Comparative 10 | B | 4 | 2 | Not passed | C | 0 | 72 | 3B | — |
| Comparative 11 | A | 4 | 2 | Not passed | C | 2 | 65 | B | — |
| Comparative 12 | A | 4 | 2 | Not passed | C | 2 | 74 | B | — |
| Comparative 13 | A | 2 | 0 | Not passed | C | 0 | 72 | 6B | — |
| Comparative 14 | D | 4 | 2 | Not passed | C | 0 | 89 | 3B | — |
| Comparative 15 | B | 4 | 2 | Not passed | C | 2 | 71 | B | — |
| Comparative 16 | B | 4 | 2 | Not passed | C | 2 | 82 | B | — |
| Comparative 17 | B | 4 | 2 | Not passed | C | 2 | 81 | B | — |

*3 It was too opaque to measure.

Comparison Example 9 is that a photocatalyst layer was adhered on a substrate without an adhesive layer. The photocatalyst layer did not adhere at all and exfoliated easily. The surface of polyester film was deteriorated after a durability test due to photocatalytic action. Holes and cracks were observed by a stereoscopic microscope.

In Comparison Examples 10 to 13 an amount of polysiloxane or colloidal silica was added too little or too much. In each case, the adhesiveness was poor after the tests of alkali resistance or sunshine weather meter.

In Examples 26 and 27 an acrylic-silicon resin was used as an adhesive layer and, as a photocatalyst layer, a composite consisting of 40–50% by weight of fine particles of titanium oxide P-25 (Nippon Aerosil Co., Ltd.), 40% by weight of silica sol shown in (Z-1) and 10–20% by weight of zirconium oxide sol was used. The results of the alkali resistance test as well as durability and accelerated weathering tests were good.

In Examples 28 to 32 an acrylic-silicon resin containing polysiloxane was used as an adhesive layer. The same starting material powder as that in Example 26 was used for a photocatalyst layer, but a type and quantity of a. sol solution were changed to form a gel for making a composite. Catalytic activity was good. All properties of alkali resistance, durability and accelerated weathering were also good. When a polysiloxane-introduced resin was an acrylic-silicon resin containing 3% of silicon (Examples 28 and 29) or an acrylic-silicon resin containing 10% of silicon (Examples 30, 31 and 32), the test results of alkali resistance, durability and accelerated weathering were good.

In Examples 34 and 35 a rigid PVC sheet or transparent acrylic plate was used as a substrate. Products were obtained with good photocatalytic activity, adhesiveness, alkali resistance and durability.

Good products were obtained when a polysiloxane-introduced resin was an epoxy-silicon resin (Examples 33 and 36), a polyester-silicon resin (Example 34) or an acrylic resin (Example 42). To compare to these, as shown in Comparison Example 10, if polysiloxane content was more than 70% by weight, even though an acrylic-silicon resin containing polysiloxane was used as an adhesive layer, the photocatalyst layer did not adhere and exfoliated.

In Examples 38 to 43 a resin containing colloidal silica was used as an adhesive layer. The results of catalytic activity, alkali resistance, durability and accelerated weathering were good. The results were particularly very good when colloidal silica of very fine particles in diameter (KS-2) was used and a colloidal-silica introduced resin was an acrylic-silicon emulsion (Examples 40 and 41).

To compare to the above, adhesiveness and durability became drastically bad when the content of colloidal silica in the adhesive layer was as much as 50% by weight Comparison Example 11

In Examples 34 to 37 a titania sol acidified with nitric acid (containing 10% by weight of titanium oxide) was used as a photocatalyst instead of using fine particles of titanium oxide (P-25, Nippon Aerosil Co., Ltd.). Silica sol (Shokubai Kasei Co., Ltd., Trade name: Cataloid SI-30), Alumina sol-200 (Nissan Chemical Industry Co., Ltd.) and zirconia sol (Nippon Soda Co., Ltd.) were mixed together with the said photocatalyst, adjusted the pH to 1.5 and dispersed. A prescribed amount of a surface active agent was added to make a coating solution for an adhesive layer. An adhesive layer and photocatalyst layer were formed by bar coating. The results of adhesiveness, durability and alkali resistance were good. Photocatalytic activity was high even though the layer was thin. An addition of silicon alkoxide to a photocatalyst layer did not greatly reduce adhesiveness and durability.

In Examples 38, 39 and 41 a coating solution used for a photocatalyst layer was prepared by sufficiently heating an ethanol solution of silicon tetraethoxide or a silane coupler to mix with a solution of metal oxide sol, followed by dispersing a photocatalyst. A photocatalyst layer was coated over a carrier coated with an adhesive layer. Products obtained were excellent in alkali resistance, durability, pencil hardness and transparency.

Samples obtained in Examples 26 to 50, which underwent a durability test with black light in an environment of high temperature and humidity, alkali resistance test and accelerated weathering test by a sunshine carbon arc weather meter, were examined for photocatalytic activity by the same method as that used in the beginning based on an amount of photo-decomposed acetaldehyde. Each sample showed exactly the same value as the corresponding amount of decomposed acetaldehyde at the initial stage. The initial photocatalytic activity was maintained perfectly.

Antibacterial Evaluation

Samples of structures carrying a titanium-oxide were prepared by the same method as that used in Example 32. The samples underwent antibacterial evaluation by the aforementioned method. The results show that a survival rate of *E coli* was 92% an hour later, 91% 2 hours later and 91% 3 hours later when a sample was kept in a dark place without irradiation. When irradiated with black light, the survival rate was 52% after an hour, 29% after 2 hours and 11% after 3 hours. For those irradiated with fluorescent lamps the survival rate was 76% after an hour, 54% after 2 hours and 22% after 3 hours. The irradiated photocatalyst-carrying structures exhibited to be more antibacterial than those kept in the dark place.

Comparison Example 18

Liquid A was a solution comprising 100 parts of titanium oxide powder (Nippon Aerosil Co., Ltd., Trade name: P-25), 900 parts of isopropanol and 100 parts of zirconium tetrabutoxide (Nippon Soda Co., Ltd., TBZR). Liquid B was a solution consisting of 900 parts of isopropanol, 200 parts of ethanol and 100 parts of water. Liquid A was placed in a polyethylene beaker. Three pieces of nonwoven fabric (glass fiber nonwoven fabric SAS-030, Oribest Co., Ltd.) of 10 cm square were immersed in the beaker and shook by a shaker for 30 minutes in order to penetrate Liquid A into the nonwoven fabric pieces. The three pieces were taken out from Liquid A and immersed in Liquid B in an enameled beaker for 30 minutes. The fabrics were taken out from Liquid B and dried in a vacuum dryer for 8 hours at 60° C. and further at 150° C. at atmospheric pressure for an hour for preparing photocatalyst-carrying structures.

Cellophane tape was applied on the structures to test exfoliation. A large quantity of photocatalyst powder was attached on the sticky surface of the tape. Further these structures were immersed in an aqueous solution of 5% by weight of sodium carbonate for 24 hours, followed by washing with distilled water. The washing water became white turbid, which showed that the photocatalyst came off.

Examples 44–50

A zirconium oxynitrate solution of (Z-6) or (Z-7) was used. The test results are shown in Table 4. The obtained products had good photocatalytic activity, adhesiveness, alkali resistance and light transmittance. The Haze percentage was as low as less than 5% so as to be highly transparent.

As shown in the above examples, structures with excellent properties were obtained by applying a variety of coating methods such as bar coating, dipping, gravure printing or spraying for forming a coat when a film or plate of polymer, glass or metal was used as a substrate.

The whole light transmittance through both of the photocatalyst and adhesive layers of a photocatalyst-carrying structure at 550 nm was more than 70%, though depending on thickness of a photocatalyst layer. Products with good light transmittance were obtained. Some products were highly transparent with the Haze percentage of less than 5%.

INDUSTRIAL USE

The photocatalyst-carrying structures of the present invention have very high photocatalytic activity thanks to the strong adhesion of a photocatalyst on a carrier. The carrier is not deteriorated due to photocatalytic activity. The photocatalyst does not come off. The structures can be used for a long period of time even if irradiated with light. The results of alkali resistance test are good. The adhesiveness is maintained well after an accelerated weathering test is carried out by a sunshine carbon arc weather meter. Thus photocatalyst-carrying structures applicable in an environment of high temperature and humidity or outdoors can be produced according to the present invention. In addition, a transparent layer letting visible rays passing through can be produced so that a catalyst can be coated on a patterned carrier without damaging the pattern. The photocatalyst-carrying structures keep excellent photocatalytic activity without damaging the decoration of a wide variety of carriers such as general-purpose resins and natural fibers.

What is claimed is:

1. A photocatalyst coating composition which comprises a photocatalyst and at least one compound which imparts alkali resistance to said composition, which compound is selected from the group consisting of a zirconium compound, a tin compound, and admixtures thereof.

2. A photocatalyst coating composition according to claim 1, in which the zirconium compound or tin compound is a compound represented by Formula [I]

$$MO_xL_y \qquad \text{Formula [I]}$$

wherein M is zirconium or tin, x is 0, 1 or 2, L is a substituent selected from the group consisting of hydroxyl, nitrate, carbonate, ammonium, chlorine, carboxyl of 1 to 6 carbons, alkoxy of 1 to 6 carbons, glycol of 1 to 6 carbons and a group able to substitute the said alkoxyl to form a metal chelate compound, y is 0 or an integer from 1 to 4 and 2x+y=4, or a mixture thereof.

3. The photocatalyst coating composition according to claim 1, in which the zirconium compound or tin compound is a compound selected from the group consisting of zirconium or tin oxide, hydroxide, oxyhydroxide, oxynitrate, oxycarbonate, alkoxides of 1 to 4 carbons and hydrolysates of the said alkoxides, or a mixture thereof.

4. The photocatalyst coating composition according to claim 1, in which 0.02–1% by weight of a zirconium compound and a tin compound is contained in conversion to the weight of metal oxide, to the whole coating material.

5. The photocatalyst coating composition according to claim 1, in which the photocatalyst contains titanium oxide as a major component.

6. The photocatalyst coating composition according to claim 1, in which the photocatalyst is a water-dispersible sol of titanium oxide of 5–40 nm in diameter of crystal particle.

7. The composition of claim 1, which includes 2 to 10 weight percent of said zirconium or tin compound (on a metal oxide basis) based on the weight of the photocatalyst coating composition.

8. The photocatalyst coating composition of claim 1 wherein the compound is a compound of tin and is selected from the group consisting of oxide, hydroxide, oxyhydroxide, oxynitrate, oxycarbonate, alkoxides of 1 to 4 carbon atoms, hydrolysates of said alkoxides and admixtures of said tin compounds.

9. A photocatalyst coating composition of a photocatalyst and at least one compound which imparts alkali resistance to said composition wherein said composition comprises the following components of (1) to (5):

(1) 0.0001–1% by weight of a surface active agent to the whole coating material;

(2) 0.5–10% by weight of a sol of oxide or hydroxide of metal selected from silicon, aluminum, niobium and tantalum or a mixture thereof as a photocatalyst binder, as a solid matters, to the whole coating material;

(3) 0.02–3% by weight of said at least one compound which compound is selected from the group consisting of zirconium compound, said tin compound and mixtures thereof;

(4) 0.5–10% by weight of a photocatalyst, as solid matter, to the whole coating material; and (5) water alone or a mixed solvent of water and alcohol with range of 100/0–20/80 of water/alcohol ratio by weight.

10. The photocatalyst coating composition according to claim 9, in which the sol of metal oxide or hydroxide is a hydrolysate of an alkoxide having at least an alkoxy group of 1 to 5 carbons and selected from silicon, aluminum, niobium and tantalum or two or more of the hydrolysates or products produced from the said hydrolysates and a specific surface area is 50 m²/g or more when dried at 150° C.

11. The photocatalyst coating composition according to claim 9, in which 0.1–5% by weight of a silicon alkoxide having an alkoxy group of 1 to 5 carbons and/or polycondensation reaction products of the said silicon alkoxide is contained, as nonvolatile matter, to the whole photocatalyst coating solution.

12. The photocatalyst coating composition according to claim 9, in which 0.1–5% by weight of a silicon-modified resin or silane coupler is contained to the whole coating material composite.

13. The photocatalyst coating composition according to claim 9, in which the alcohol is methanol, ethanol, n-propanol or isopropanol alone or a mixture thereof.

14. A photocatalyst-carrying structure in which an adhesive layer is placed between a photocatalyst layer and a carrier; and in which the photocatalyst layer comprises a photocatalyst and at least one compound to impart alkali resistance to said photocatalyst layer, wherein said at least one compound is a compound of a metal selected from the group consisting of zirconium, tin, and admixtures thereof.

15. A photocatalyst-carrying structure in which an adhesive layer is placed between a photocatalyst layer and a carrier; and in which the photocatalyst layer comprises a photocatalyst and at least one compound to impart alkali resistance to said photocatalyst layer, wherein said at least one compound is a compound of metal selected from the group consisting of zirconium and tin, in which the adhesive layer is a silicon-modified resin containing 2–60% by weight of silicon, a resin containing 5–40% by weight of colloidal silica or a resin containing 3–60% by weight of polysiloxane which is a product of a polycondensation reaction of a compound represented by Formula [II]

$$SiCl_{n_1}(OH)_{n_2}R_1{n_3}(OR_2)_{n_4} \qquad \text{Formula [II]}$$

Wherein $R_1$ is a $C_1$–$C_8$ alkyl which may be substituted by amino, carboxyl or chlorine, $R_2$ is a $C_1$–$C_8$ alkyl substituted by an alkyl having 1 to 8 carbons or an alkoxy, $n_1$, $n_2$, and $n_3$ are 0, 1 or 2, $n_4$ is an integer from 2 to 4 and $n_1+n_2+n_3+n_4=4$; and the photocatalyst layer is a photocatalyst complex containing 2–30% by weight of a zirconium compound and/or tin compound, in conversion to the weight of metal oxide, to the whole photocatalyst layer 15–85% by weight of a gel or metal oxide or hydroxide as solid matter to the whole photocatalyst layer and 5–75% by weight of a photocatalyst to the whole photocatalyst layer.

16. A photocatalyst-carrying structure according to claim 15, in which the photocatalyst layer is formed using a photocatalyst-layer coating solution containing 0.1–5% by weight of silicon alkoxide with an alkoxy of 1 to 5 carbons and/or a polycondensation reaction product of the said silicon alkoxide, as a nonvolatile matter, to the whole photocatalyst coating solution.

17. A photocatalyst-carrying structure according to claim 15, in which the silicon-modified resin in the adhesive layer is an acrylic-silicon resin, epoxy-silicon resin, polyester-silicon resin or a mixed resin thereof.

18. A photocatalyst-carrying structure according to claim 15, in which the polysiloxane contained in the polysiloxane-containing resin of the adhesive layer is a hydrolysate of silicon alkoxide having an alkoxy group of 1 to 5 carbons or a product produced from the said hydrolysate.

19. A photocatalyst-carrying structure according to claim 15, in which the colloidal silica contained in the colloidal silica-containing resin of the adhesive layer is smaller than 10 nm in particle diameter.

20. A photocatalyst-carrying structure according to claim 15, in which the adhesive layer is a silicon-modified resin containing polysiloxane.

21. A photocatalyst-carrying structure according to claim 15, in which the adhesive layer is a silicon-modified resin contained colloidal silica.

22. A photocatalyst-carrying structure according to claim 15, in which the adhesive layer is 0.1 μm–20 μm thick.

23. A photocatalyst-carrying structure according to claim 15, in which the photocatalyst layer is 0.1 μm–20 μm thick.

24. A photocatalyst-carrying structure according to claim 15, in which the whole light transmittance through both of the adhesive and photocatalyst layers at the wavelength of 550 nm is more than 70%.

25. A photocatalyst-carrying structure according to claim 15, in which adhesiveness gains 6 points or more by a cross-cut Scotch tape test defined in JIS K5400 after irradiating with black light of 3 mW/cm² of ultraviolet intensity at 40° C. and 90% R.H. for 500 hours.

26. A photocatalyst-carrying structure according to claim 15, in which the carrier is in the shape of a particle, film, plate, tube, fiber or net.

27. A photocatalyst-carrying structure according to claim 15, in which a carrier material is organic polymer or metal.

28. The photocatalyst-carrying structure according to claim 15, wherein the photocatalyst layer comprises 2 to 10 weight percent of said zirconium or tin compound (on a metal oxide basis) based on the weight of the photocatalyst coating composition.

29. A photocatalyst-carrying structure according to claim 15, wherein the photocatalyst layer further comprises a gel of an oxide of a metal, a hydroxide metal, or admixtures thereof, in each of which the metal is selected from the group consisting of silicon, aluminium, niobium and tantalum, wherein each of said metal oxide and said metal hydroxide is characterized by a surface area of a least 50 mg²/g.

30. The photocatalyst-carrying structure according to claim 15, wherein the compound of tin is selected from the group consisting of oxide, hydroxide, oxyhydroxide, oxynitrate, oxycarbonate, alkoxides of 1 to 4 carbon atoms, hydrolysates of said alkoxides and admixtures of said tin compounds.

31. A photocatalyst-carrying structure in which an adhesive layer is placed between a photocatalyst layer and a carrier; and in which the photocatalyst layer comprises a photocatalyst and at least one compound to impart alkali resistance to said photocatalyst layer, wherein said at least one compound is a compound of a metal selected from the group consisting of zirconium and tin, in which the structure passes an alkali resistance test defined in JIS K5400 after the surface of the photocatalyst-carrying structure is contacted with an aqueous solution of 5% by weight of sodium carbonate at 20° C. for 24 hours.

32. A photocatalyst-carrying structure in which an adhesive layer is placed between a photocatalyst layer and a carrier; and in which the photocatalyst layer comprises a photocatalyst and at least one compound to impart alkali resistance to said photocatalyst layer, wherein said at least one compound is a compound of a metal selected from the group consisting of zirconium, tin, and admixtures thereof, in which the zirconium compound and/or tin compound contained in the photocatalyst layer is a compound represented by Formula [I]

$$MO_xL_y \qquad \text{Formula [I]}$$

wherein M is zirconium or tin, x is 0, 1 or 2, L is a substituent selected from the group consisting of hydroxyl, nitrate, carbonate, ammonium, chlorine, carboxyl of 1 to 6 carbons, alkoxy of 1 to 6 carbons, glycol of 1 to 6 carbons and a group able to substitute the said alkoxy group to form a metal chelate compound, y is 0 or an integer from 1 to 4, and 2x+y=4, or a mixture thereof.

33. A photocatalyst-carrying structure in which an adhesive layer is placed between a photocatalyst layer and a carrier; and in which the photocatalyst layer comprises a photocatalyst and at least one compound to impart alkali resistance to said photocatalyst layer, wherein said at least one compound is a compound of a metal selected from the group consisting of zirconium, tin, and admixtures thereof, in which the content of the zirconium and/or tin compound contained in the photocatalyst layer is 2–10% by weight, in conversion to the weight of metal oxide, to the whole photocatalyst layer.

34. A photocatalyst coating composition which comprises a photocatalyst and at least one compound which imparts alkali resistance to said composition; wherein said at least one compound is selected from the group consisting of a zirconium compound, a tin compound and admixtures thereof, and said photocatalyst coating is photo-catalytically active with black light irradiation.

35. A photocatalyst coating composition which comprises a photocatalyst and at least one compound which imparts alkali resistance to said composition; wherein said at least one compound is selected from the group consisting of a zirconium compound, a tin compound and admixtures thereof and said photocatalyst coating is photo-catalytically active in sunlight and outdoor conditions.

* * * * *